Figure 3:
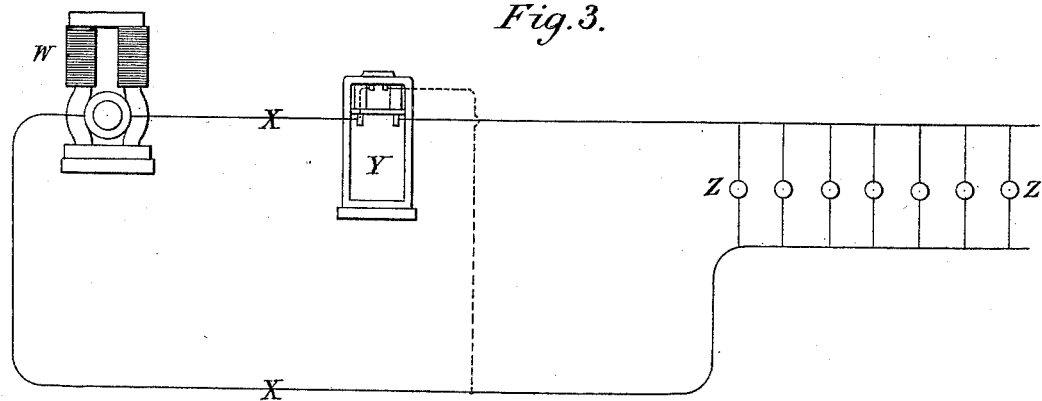

(No Model.)
S. Z. DE FERRANTI.
ELECTRIC METER.
No. 440,627.
2 Sheets—Sheet 1.
Patented Nov. 18, 1890.
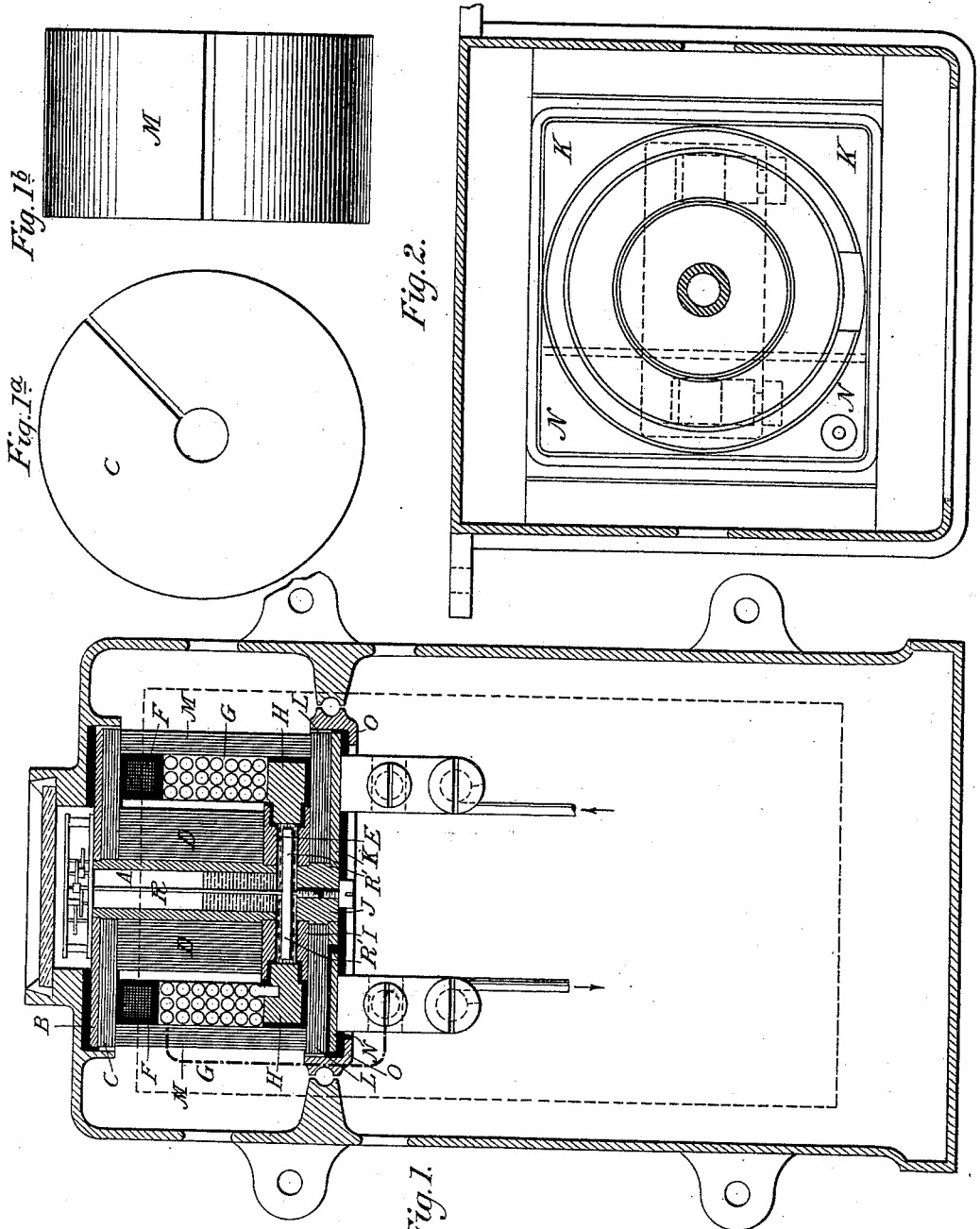
WITNESSES:
INVENTOR (No Model.) 2 Sheets—Sheet 2.

S. Z. DE FERRANTI.
ELECTRIC METER.

No. 440,627. Patented Nov. 18, 1890.

WITNESSES: INVENTOR
Sebastian Ziani de Ferranti
BY
Baldwin, Davidson & Wright
his ATTORNEYS.

UNITED STATES PATENT OFFICE.

SEBASTIAN ZIANI DE FERRANTI, OF HAMPSTEAD, COUNTY OF MIDDLESEX, ENGLAND.

ELECTRIC METER.

SPECIFICATION forming part of Letters Patent No. 440,627, dated November 18, 1890.

Application filed October 9, 1888. Serial No. 287,611. (No model.) Patented in England January 15, 1887, No. 701.

*To all whom it may concern:*

Be it known that I, SEBASTIAN ZIANI DE FERRANTI, electrician, a subject of the Queen of Great Britain, residing at 120 Fellowes Road, Hampstead, in the county of Middlesex, England, have invented certain new and useful Improvements in Electrical Meters, (for which I have received Letters Patent in Great Britain, No. 701, dated January 15, 1887,) of which the following is a full specification.

This invention has for its object improvements in electric meters. It is applicable to all meters in which the quantity of current is measured and recorded by a train of counting-wheels or other recording apparatus connected with an axis or part which is set in motion by the current in its passage through the meter. In such meters the mechanical friction of the parts interferes with the accuracy of the record. According to my invention, to compensate for the extent of friction, I provide the meter with a compensating-coil in addition to the coil or coils by which the current to be measured passes through the meter. A current is caused to pass in this coil, which aids in keeping the meter in movement when the current to be measured is small. The compensating coil is inductively influenced by the main coil, and when the current to be measured is large a current is induced in the compensating coil, which tends to moderate the influence of the large current. Thus the desired compensation is obtained. In electric meters, also, I employ laminated iron to avoid the effects of residual magnetism and heating-currents. Preferably I adopt the following construction: I form the field-magnet of laminæ of soft iron magnetically insulated and so arranged as to inclose the coils. The poles of the field-magnet are annular and one over the other. Between them is a shallow trough containing mercury, by which the current to be measured is conducted from the center to the circumference of the trough. The mercury is thus put in motion. It carries with it a float or body immersed in it, and this latter imparts the movement to a counting train of wheels.

In the drawings annexed I have shown a meter thus constructed.

Figure 1 is a vertical section, and Fig. 2 is a horizontal section; Fig. 1ª, a detail view of one of the radially-slotted disks; Fig. 1ᵇ, a similar view of a slotted cylinder of the field-magnet. Fig. 3 is a diagram illustrating the connection of the meter in circuit.

A is a tubular stem of non-magnetic material, with a disk B surrounding its upper end. Below this are radially-slotted iron disks C, with insulating material between them. Below these the tubular stem has thin iron coiled around it, with insulating material between succeeding layers. This coil D is held in place by a disk E, secured to the end of the stem A. Around the iron coil D is the additional coil F, of fine insulated wire, and also the insulated coil G, through which the current to be measured has to pass. Below this is a brass metal ring H, insulated from the disk E, and iron coils. The bottom of the central hole of the ring is closed by a plate I, held firmly up against the bottom of the ring, with insulating material placed between the two. The upper surface of the plate is enameled and forms the bottom of the mercury bath of the meter.

J is a metallic stud passing through the center of the plate I. The upper surface of this stud is uninsulated. The lower end of the stud is secured to a plate K, which carries one of the terminals, as shown.

L are slotted iron disks placed between the plates I and K.

M are concentric cylinders of thin iron connecting the iron disks C with the iron disks L. Each cylinder has a slot formed longitudinally through it, which, in addition to preventing currents being set up in the cylinders, also allows of wire connections being carried through to the insulated wire coils.

N is a metallic plate placed below the iron disks L, and insulated from them and from the plate K. The plates K and N rest on the bottom of a tray O.

R is the central spindle of the meter. It carries arms R′, immersed in the mercury contained in the shallow bath on the plate I, and at its upper end it gives motion to a train of recording-wheels.

The thin iron C, D, L, and M constitutes the core of the field-magnet, and from its construction it opposes little resistance to the reversal of its magnetism and does not retain residual magnetism. Its annular poles, as will be seen, are in close proximity to the mercury bath immediately above and below it. The arms R' and mercury constitute an armature suitable to be put into rotation by the action of the current passing in the coils. The current from the mains enters the meter, say, at the terminal K, passes to the center of the bath through the stud J, and from the circumference of the bath to the metallic ring H, and from it to the inner end of the insulated wire coil G, and from the outer end of this coil to the terminal N. The ends of the additional coil F are, as before stated, so coupled to the mains that a current passes through it continuously without passing through the mercury bath.

Fig. 3 illustrates the connections. W represents the dynamo; X, conductors leading therefrom; Y, one of the meters, and Z Z a series of lamps. The coil G is in one of the lamp-leads next the dynamo, and the coil F is between the leads parallel with the lamps. The tray O is secured within the outer casing P by means of sulphur poured when melted into semicircular recesses formed along two opposite sides of the tray and corresponding recesses formed on the interior of the casing, as shown. Before pouring in the sulphur to secure the tray it is forcibly pressed toward the upper end of the casing to clamp together the several parts above described, and while the parts are so clamped and held the sulphur is poured in and the tray thereby securely held.

I would remark that it may in some cases be convenient to derive the currents supplied to the meter from converters in place of connecting the coils of the meter with the electric main or mains. This, it will be understood, makes no substantial change.

I would remark that I do not restrict my claim to the meter shown, as my invention is applicable to other meters in which movement is obtained from the current to be measured.

I claim—

1. In an electric meter, the combination of a rotating armature, registering mechanism driven thereby, a coil carrying the current to be measured and within the field of which the armature rotates, and a compensating coil of higher resistance also acting to produce rotation of the armature.

2. In an electric meter, the combination of a coil through which the current to be measured passes, a rotating armature arranged in the field thereof and driven by the current passing therethrough, registering mechanism driven by the armature, and a supplementary coil also acting to produce rotation of the armature, for the purpose set forth.

3. The combination of a rotating armature, registering mechanism driven thereby, a coil in which the current to be measured passes, which coil creates a magnetic field in which the armature rotates and is connected in series or directly in one of the leads of the current, and a compensating coil of high resistance also acting to produce rotation of the armature and cross-connected between the leads of the circuit.

4. The combination of two stationary coils, one a coil in which the current to be measured passes and the other a compensating coil of higher resistance in which a current not to be measured passes, an armature located in the fields of said coils and rotated by their action, and registering mechanism driven by the armature.

5. The combination of two stationary coils, one a coil in which the current to be measured passes and the other a compensating coil of higher resistance in which a current not to be measured passes, an unwound armature located in the fields of said coils and rotated by their action, and registering mechanism driven by the armature.

6. The combination of two stationary coils, one a coil in which the current to be measured passes and the other a compensating coil of higher resistance in which a current not to be measured passes, an unwound armature through which the current to be measured passes located in the field of said coils and rotated by their action, and registering mechanism driven by the armature.

7. The combination, substantially as set forth, with a rotating armature, and registering mechanism driven thereby, of two stationary coils inductively influenced one by the other, within the fields of which the armature is located, both coils acting to produce rotation of the armature, whereby the recording mechanism is actuated at a speed proportional to the current.

8. The combination, substantially as set forth, of a coil through which the current to be measured passes, a high-resistance compensating coil, the laminated core and pole pieces of the two coils, and a rotating armature located in the field of said coils, and registering mechanism driven thereby.

9. The combination, substantially as set forth, of the laminated field-magnet D C M L, having annular poles in proximity to each other, the coils G F, inclosed within the magnet, a mercury bath located between the annular poles of the magnet, contacts and circuit-connections by which current traversing the coil G is passed radially through the mercury bath, and registering mechanism actuated by the movement of the mercury.

10. In an electric meter, the combination, substantially as set forth, of a field-magnet consisting of magnetically-insulated laminæ of soft iron, coils F G incased therein, one of the coils through which the current to be measured passes being of low resistance and the other a compensating coil of relatively high resistance, a rotating armature in the field of said coils and magnet, and registering mechanism driven thereby.

11. In an electric meter, the combination, substantially as set forth, of a field-magnet having inner and outer concentric walls D M, a coil through which the current to be measured passes located between said walls, a mercury bath located in the field of said coil, circuit-connections for passing the current traversing said coil radially through the mercury bath, and registering mechanism driven by the rotation of the mercury.

12. The combination, substantially as set forth, of a magnet-core composed of insulated laminæ of soft iron having inner and outer concentric walls D M, plates C, connecting the walls at one end and plates L connecting with the outer wall at the other end, a magnetizing-coil through which the current to be measured passes inclosed between the inner and outer walls, an armature located between the end of the inner wall and the end plates L, and registering mechanism driven by the armature.

SEBASTIAN ZIANI DE FERRANTI.

Witnesses:
FREDERICK SPANSWICK,
24 *Southampton Buildings, London.*
WALTER J. SKERTEN,
17 *Gracechurch Street, London.*